(No Model.) 2 Sheets—Sheet 1.
B. D. NORTHRUP.
VALVE ROD ADJUSTER.
No. 497,681. Patented May 16, 1893.
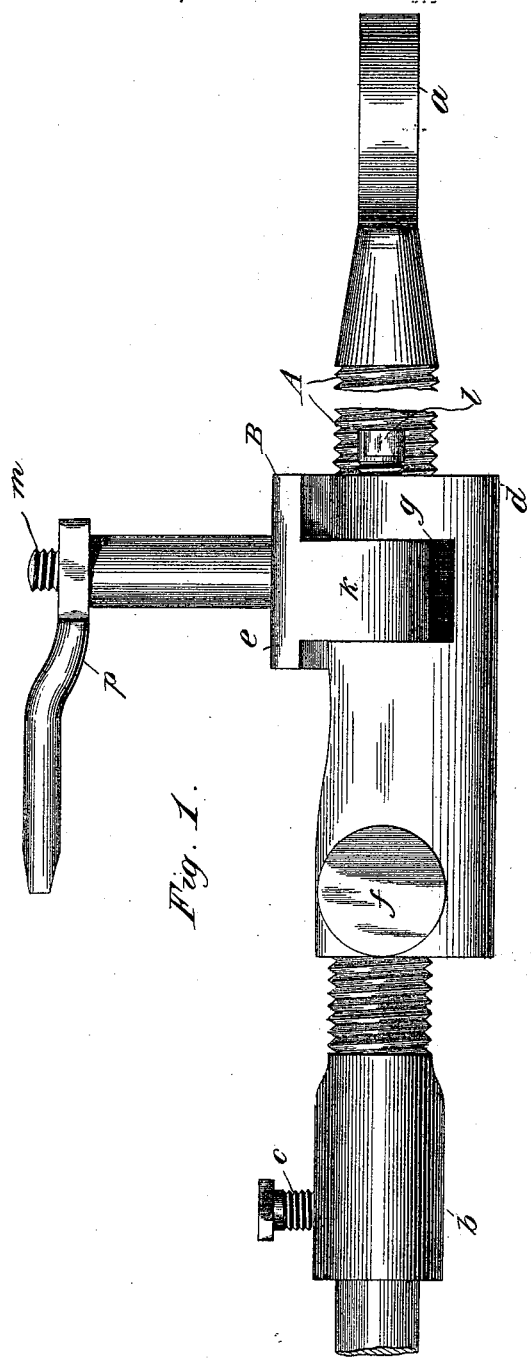
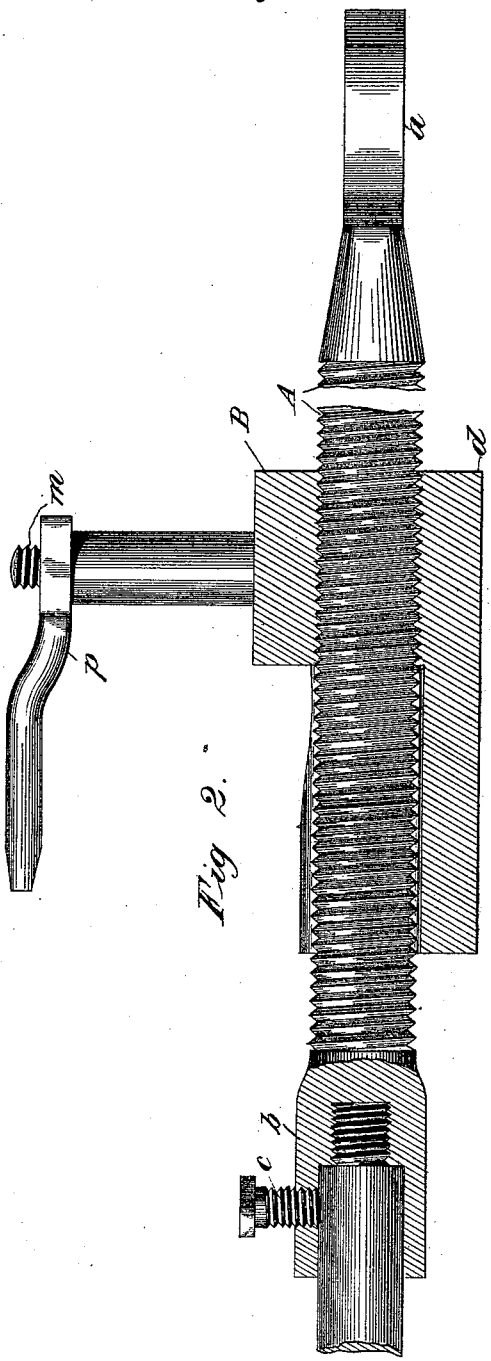
WITNESSES
Arthur A. Erb.
Arthur C. Clarke.
INVENTOR
Blancher D. Northrup.
by Frank L. Dyer
Attorney (No Model.) 2 Sheets—Sheet 2.
B. D. NORTHRUP.
VALVE ROD ADJUSTER.
No. 497,681. Patented May 16, 1893.
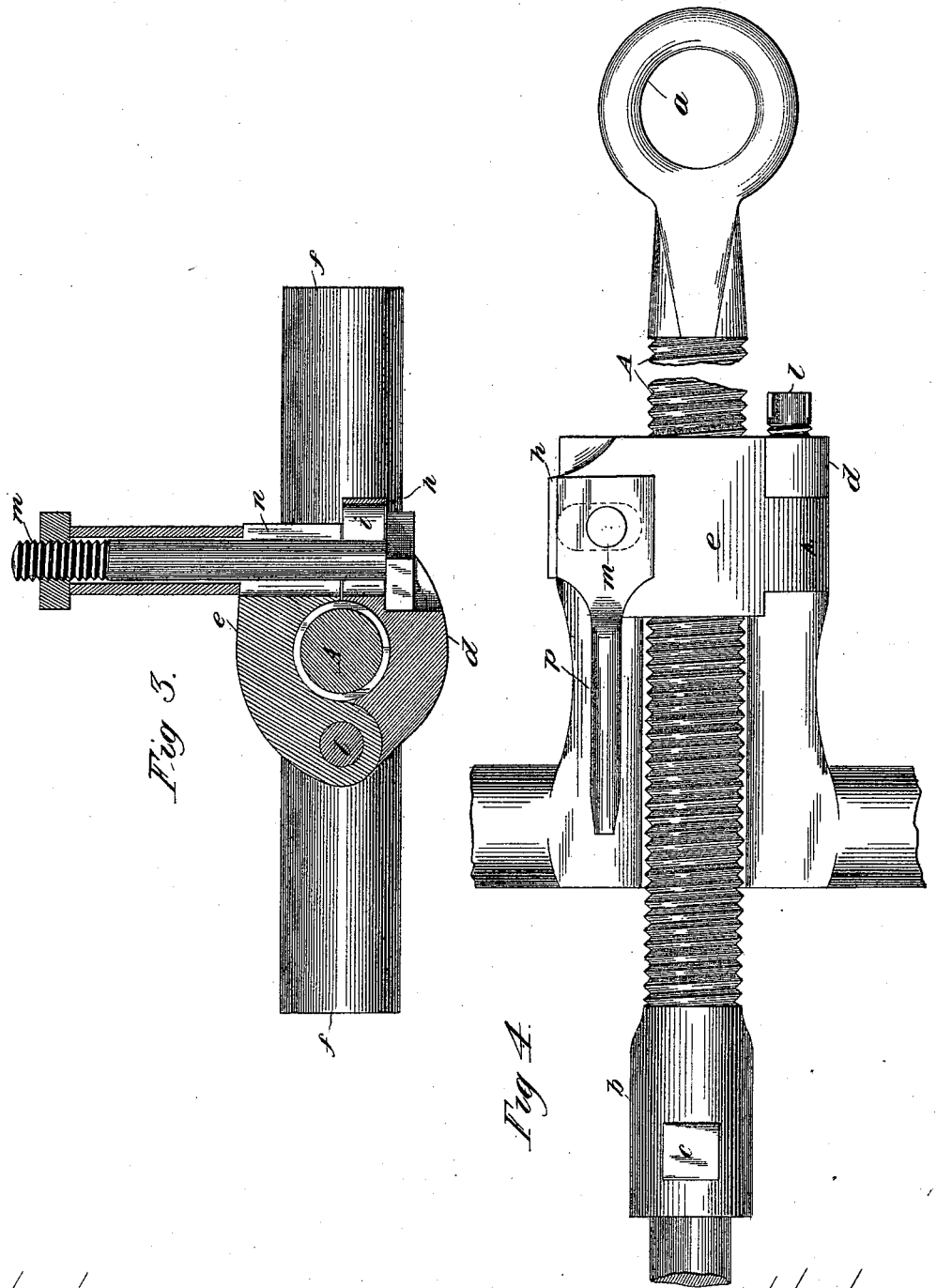
WITNESSES
Arthur A. Ort.
Arthur C. Clarke.
INVENTOR
Blancher D. Northrup.
by Frank L. Dyer
Attorney

UNITED STATES PATENT OFFICE.

BLANCHER D. NORTHRUP, OF WASHINGTON, PENNSYLVANIA.

VALVE-ROD ADJUSTER.

SPECIFICATION forming part of Letters Patent No. 497,681, dated May 16, 1893.

Application filed July 10, 1891. Serial No. 399,073. (No model.)

*To all whom it may concern:*

Be it known that I, BLANCHER D. NORTHRUP, a citizen of the United States, residing at Washington, in the county of Washington and State of Pennsylvania, have invented certain new and useful Improvements in Polish-Rod Adjusters; and I do hereby declare the following to be a full, clear, and exact description of the invention, which will enable others skilled in the art to which it appertains to make and use the same.

My invention relates to an improved adjuster for the valve rods of deep well pumps which are used at present in the oil producing regions of this country for pumping oil from oil wells, and which may be used in other connections and for other purposes.

The object I had in view in making the present invention, was to produce a device, whereby the position of the pump lever in relation to the valve rod might be quickly and easily adjusted.

In the deep wells which are now used, it has been found very difficult if not impossible to effect a proper adjustment between the pump lever and the valve rod, but by the use of my invention, which is very simple and durable, this adjustment may be quickly and easily effected. In oil well pumpings, for various reasons, it becomes positively necessary to continually change the adjustment between the pump lever and the valve rod, for which purpose the present invention is well adapted.

The principal novelties of the present invention consist of a split nut, of peculiar construction having a locking arrangement at one side which when closed completes the entirety of the nut, and trunnions at each side to which the pump lever or other operating elements are attached. The upper portion of the valve rod is screw threaded and is provided with a chuck at its lower end for holding the upper end of the valve rod proper. The split nut before alluded to is screw threaded on its interior and engages with said screw threaded valve rod. By screwing the nut up or down a very accurate adjustment between the pumping lever and the valve rod is obtained and by means of the locking arrangement the split nut may be securely fastened at any point on the screw threaded portion of the valve rod. By loosening the locking arrangement the split nut may be turned on the screw threaded portion of the valve rod, and the adjustment may thereby be effected as may be desired. The relative position between the pumping lever and the valve rod may be varied by holding the split nut in a stationary position and screwing the threaded portion of the valve rod within the same.

For a better comprehension of the invention, attention is directed to the accompanying drawings forming a part of this specification, in which—

Figure 1, is a side elevation of the device, detached from the operating engine; Fig. 2, a longitudinal sectional view; Fig. 3, a cross sectional view, and Fig. 4, a plan view.

In all the above views, corresponding parts are designated by identical letters of reference.

A, represents the upper portion of the valve rod. This element is made of steel, and is screw threaded externally as shown in the drawings. It is provided at its upper end with a suitable eye $a$, by means of which the valve rod and valves may be raised so as to be removed from the wells. At the lower end this screw threaded valve rod is provided with an annular chamber $b$, therein which is screw threaded at its upper part. The valve rod proper is introduced into its chamber and is screwed therein and will be retained in position by means of the set screw $c$.

B is the split nut before referred to. This nut is composed of two principal parts $d$, and $e$. The upper part $d$, is of a general semi-circular shape. At the lower portion it is provided with two trunnions $f, f$, to which the pumping lever or other operating element of the engine is attached.

The present invention having no particular reference to the operating engine, or pumping lever or the attachments between the pumping lever and the adjuster, the latter element only is shown. The upper portion of the part $d$ is screw threaded as shown. On one side of the part $d$, is a dovetail or mortise $g$, and on the other side is a lug $h$, which is provided with an elongated opening $i$, therein. The other portion of the split nut is provided with a similar screw threaded portion $j$, corresponding to the screw threaded portion of the part $d$. The part $e$ of the split nut has a tenon $k$, at one side, which engages with the dovetail or mortise before referred to. This tenon $k$, is held in the mortise by means of a screw threaded pin $l$, which is passed down between the two so that a hinged joint will be formed at that point.

$m$, is a bolt which passes through the small opening $i$, and which is provided with a collar working thereon. By making the opening $i$, elongated as shown, the bolt $m$, may be moved to one side so as to allow the smaller portion $e$, of the split nut to be closed so that the screw threaded portions of the two parts will present a single annular screw threaded chamber. When the smaller portion $e$ has been closed, the bolt $m$ is moved toward the smaller portion $e$, of the split nut and will engage with the slot $n$, in the side thereof. $p$, is a nut provided with a handle and engaging with the threaded end of the nut $m$, and which may be screwed up so as to cause the collar $o$ to bear on the outer face of the portion $e$, of the nut so as to lock the two parts securely together. By loosening this nut $p$ the bolt $m$ may be moved to one side so that the smaller part $e$ of the split nut may be swung outwardly. When in this position, the split nut is placed upon the screw threaded part of the valve rod and the portion $e$ is moved down and locked upon the same. The split nut $b$ may now be screwed up and down on the valve rod so that any desired adjustment may be obtained. When in proper adjustment the nut $p$ is turned upon the threaded portion of the bolt $m$, so as to force the two portions $d$, and $e$, together and jam upon the threaded portion of the valve rod so that the adjuster will be securely locked in place. When it is desired to remove the split nut, the nut $p$ is loosened, the portion $e$ is swung outwardly and the split nut may be easily removed. It will be evident that instead of adjusting the device by moving the nut on the rod, the reverse of these movements may be adopted, i. e., the valve rod may be screwed within the nut. It will thus be seen that I have formed a very rigid connection between the valve rod and the pumping lever and at the same time am enabled to effect any desired adjustment between the two.

Having now described my invention, what I claim as new therein, and desire to secure by Letters Patent, is as follows:

An improved polish rod adjuster for deep well pumps consisting of a split nut formed of the two, parts $d$, and $e$, the bolt $m$, on the part $d$; a collar $o$, on said bolt, and a nut $p$ engaging with the threaded end of said bolt, all adapted to operate substantially as described.

BLANCHER D. NORTHRUP.

Witnesses:
 FINLEY B. HALLAM,
 BOYD C. PARSHALL.